July 6, 1937.                T. O. R. DAHLBERG                 2,086,214
        ADJUSTING AND STOPPING DEVICE RESPECTIVELY FOR MEMBERS
         ADJUSTABLE TO TWO POSITIONS RELATIVELY TO ONE ANOTHER
                        Filed June 11, 1936
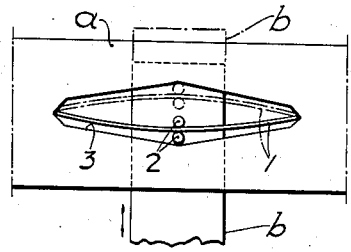
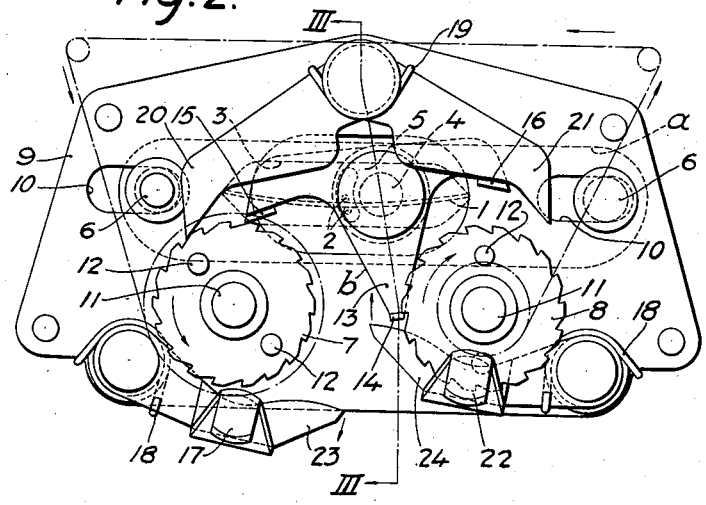
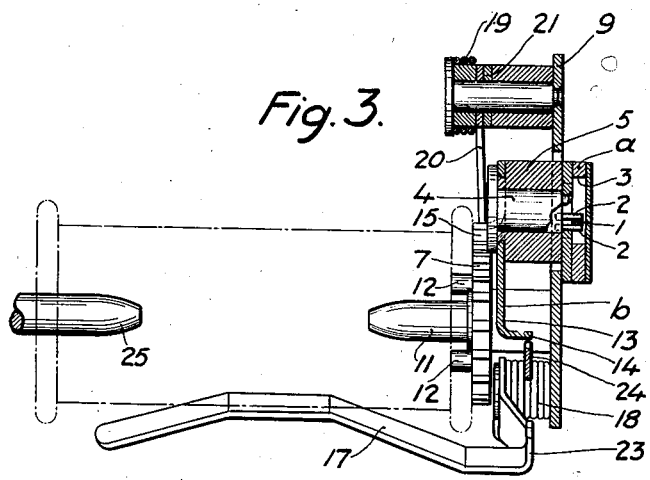
Tord Olof Rickard Dahlberg
INVENTOR
his ATT'Y.

Patented July 6, 1937

2,086,214

UNITED STATES PATENT OFFICE 2,086,214

ADJUSTING AND STOPPING DEVICE RESPECTIVELY FOR MEMBERS ADJUSTABLE TO TWO POSITIONS RELATIVELY TO ONE ANOTHER

Tord Olof Rickard Dahlberg, Stockholm, Sweden

Application June 11, 1936, Serial No. 84,696
In Sweden June 25, 1935

5 Claims. (Cl. 74—100)

In machines provided with members adjustable to two positions relatively to one another it is often necessary for the reliable function of the machines that the adjusting and stopping devices respectively which serve to adjust and stop the members in their various end positions operate positively so that they do not allow the members to assume an inoperative intermediate position. Several solutions have been proposed hitherto but the problem has not been solved in a satisfactory manner because link-and-pin connections in combination with screw springs have been used. The practical application of the said devices has shown that it is not possible to completely avoid that the members assume an inoperative intermediate position due to friction and bending stresses. However, by the present invention the problem has been solved for the first time and in a very simple way as regards the construction. The present adjusting and stopping device respectively consists of a longitudinally bent leaf spring connected with one of the members, the ends of the said spring being secured between two fixing points and the intermediate portion thereof being connected with the other member so that the direction of force of the spring is reversible at the adjustment of the members relatively to one another whereby the intermediate portion of the spring will be located on one side or the other of a line connecting the fixing points, and the said device is mainly characterized by the fact that the two members rest against one another by means of plain sliding surfaces, and that the leaf spring is inserted in a recess in one member while the other member is provided with a guide element connected with the intermediate portion of the spring and extending into the abovementioned recess.

In the drawing:

Figure 1 is a diagrammatical view of an embodiment of the device in question, $a$ and $b$ indicating the members adapted to be adjusted relatively to one another. Of these members the member $a$ is supposed to be stationary while the other member $b$ is movable up and down in the direction of arrow indicated, the last mentioned member in its one, lower end position assuming the position shown in full lines. By an impulse from some part not shown in the drawing the member is intended to be displaced to its upper position indicated by dot and dash lines in which position the member is intended to be stopped. According to the invention there is for this purpose provided a leaf spring 1 which bent in its longitudinal direction is inserted in a longitudinal recess 3 in the member $a$. By a guide element 2 provided on the member $b$ and in this case consisting of two pins fixed in the member $b$, one pin on each side of the spring, the intermediate part of the spring is connected with the said member $b$. In the embodiment in question the side edges of the recess 3 form shoulders for the guide element 2 and limit, thus, the motion of the member $b$. When the member $b$ assumes the position shown in full lines the direction of force of the spring is directed downwards and the member is, thus, held stopped in this position. At the displacement of the member $b$ in the upward direction, however, the direction of force of the spring will be reversed as soon as the intermediate part of the spring has passed a line connecting the fixing points and the spring 1 will assume the position indicated in dot and dash lines and, thus, also bring along the member $b$ to its other upper position indicated by dot and dash lines and stop the same in the said position.

Theoretically it might perhaps be imagined that the member $b$ might be held in an intermediate position by the spring 1 but at practical tests made this has proved impossible and it has been established that the spring 1 always tends to adjust the member to its one or other position or to stop it in the said position.

Figures 2 and 3 illustrate an embodiment of the adjusting and stopping device respectively applied to a reversible feeding device for inking ribbons, Figure 2 showing a lateral view of the feeding mechanism. Figure 3 is a section on line III—III of Figure 2.

In the embodiment in question the direction of force of the spring 1 is reversible by the members $a$, $b$ swinging relatively to one another, and the swingable member $b$ is provided with a hub 5 supported by a pivot 4, the guide element 2 being fixed to the said hub. This is best illustrated in Figure 3, in which part of the pivot 4 is cut away. The member $a$, in which the recess 3 for the spring 1 is made, is by means of a driving device not shown in the drawing adapted to be put into a rectilinear reciprocating motion, the member being guided by two guiding pins 6 extending into two slots 10 in a frame plate 9. Two toothed wheels 7, 8 are turnably mounted on shafts 11 on the frame plate. The shafts 11 serve together with pins 25, one of which only is shown in Figure 3, to center inking ribbon rolls fixed between the shafts 11 and the said pins and indicated by dash and dot lines whereby driving members 12 located on the toothed wheels turn the inking ribbon rolls at the turning of the toothed wheels or vice versa. The swingable member *b* is substantially T-shaped, the stem 13 of the member being at its free end provided with an angular portion 14, while its transversal portion at each end is provided with an angular portion 15 and 16 respectively.

Further there are swingable arms 17, 22 which by springs 18 tend to rest against the undersides of the inking ribbon rolls, and two swingable ratchets 20, 21 actuated by a spring 19 and serving to stop the toothed wheels in one direction of rotation. Finally, the arms 17 and 22 are provided with lugs 23, 24.

The device operates in the following manner:

If one supposes that the member *b* is held by the spring 1 in the position shown in the drawing the angular portion 15 of the said member will prevents the latter from being turned in a direction of arrow indicated in Figure 2 at the reciprocating motion of the member *a*. The angular portion 16 of the member *b* keeps the ratchet 21 out of engagement with the toothed wheel 8 which, thus, allows a turning of the inking ribbon roll in question in the direction of arrow indicated in dot and dash lines. On the other hand, the ratchet 20 cooperates with its toothed wheel 7 and prevents the latter from being turned in a direction opposite to that indicated by the arrow in question. The path and the feeding direction of the ribbon are indicated by dot and dash lines and arrows in Figure 2. During this feeding the arm 17 and the lug 23 respectively are swung in the indicated direction of arrow by the ribbon wound on the roll in question while the arm 22 and the lug 24 respectively are swung in the opposite direction due to the unwinding of the ribbon from the roll in question. Further, at the reciprocating motion of the member *a* the portion 14 of the member *b* will strike against the lug 24, the last mentioned member being then swung to its other end position.

The spring 1 changes its direction of force at the same time as the portion 15 of the member *b* by means of the spring 1 raises the ratchet 20 out of engagement with the toothed wheel 7. The member *b* now allows the ratchet 21 to engage its toothed wheel 8. Further, at the reciprocating motion of the member *a* the portion 16 of the member *b* will gradually turn the toothed wheel 8 in a direction opposite to the earlier one, and, consequently, the feeding direction of the inking ribbon will thereby be reversed.

Several different embodiments are, of course, possible within the scope of the invention. Thus, it will be immediately understood that not taking into consideration that the direction of power of the spring 1 is reversible by the relative swinging or displacement of the members *a*, *b* it is of no importance on which member the spring is located. Further, it should be observed that irrespective of its positive function the above described adjusting and stopping device respectively is particularly suitable to apply in the cases when the space offers difficulties to the use of more voluminous members, such as screw springs, or the like.

Having now described my invention, what I claim as new and desire to secure by Letters Patent is:

1. In an adjusting and stopping device of the character described, a pair of members relatively adjustable to two relative positions, said members having plane surfaces arranged in sliding contact with each other, one of said members having an elongated recess therein, a longitudinally arched leaf spring mounted in said recess with its ends fixedly braced by the opposite end walls of the recess, and a guide element carried by the other member and extending into said recess and into engagement with the intermediate portion of said spring, whereby upon relative adjustment of the members the intermediate spring portion will arch in the opposite direction, thereby reversing the force of the spring, the side walls of the recess forming abutment shoulders for said guide element to limit the movements of the latter.

2. In an adjusting and stopping device of the character described, the combination set forth in claim 1, in which one of said members is pivotally mounted with respect to the other.

3. In an adjusting and stopping device of the character described, the combination set forth in claim 1, in which the recessed member is provided with a pivot pin and the other member is provided with a hub mounted on said pivot pin so that the members are relatively pivotable, said guide element being carried by said hub.

4. In an adjusting and stopping device of the character described, the combination set forth in claim 1, one of said members being pivoted to the other, means for reciprocating said pivoted member, a pair of toothed wheels, means operable by the pivoted member when in one of its positions for rotating one of said toothed wheels during each reciprocatory movement, and means operable by the pivoted member when in the other of its positions for rotating the other toothed wheel during each reciprocatory movement.

5. In an adjusting and stopping device of the character described, the combination set forth in claim 1, one of said members being pivoted to the other, means for reciprocating said pivoted member, a pair of toothed wheels, an adjustable ratchet for each wheel, means operable by the pivoted member when in one of its positions for rotating one of said toothed wheels during each reciprocatory movement, means operable by the pivoted member when in the other of its positions for rotating the other toothed wheel during each reciprocatory movement, and shoulders on said pivoted member adapted to engage said ratchets, respectively, to hold one of them out of engagement with its toothed wheel while the other toothed wheel is being rotated.

TORD OLOF RICKARD DAHLBERG.